(12) United States Patent
Peterson et al.

(10) Patent No.: US 7,798,254 B2
(45) Date of Patent: Sep. 21, 2010

(54) EARTH BIT WITH HUB AND THRUST UNITS

(75) Inventors: Gregory W. Peterson, Arlington, TX (US); Anthony D. Podnieks, Plano, TX (US); Tim Chu, Novi, MI (US); Elisabeth Smith, Kulpsville, PA (US); Janice David, Plymouth, MI (US)

(73) Assignees: Atlas Copco Secoroc LLC, Grand Prairie, TX (US); SKF USA Inc., Norristown, PA (US)

( * ) Notice: Subject to any disclaimer, the term of this patent is extended or adjusted under 35 U.S.C. 154(b) by 190 days.

(21) Appl. No.: 11/968,804

(22) Filed: Jan. 3, 2008

(65) Prior Publication Data

US 2009/0173546 A1    Jul. 9, 2009

(51) Int. Cl.
 *E21B 10/22* (2006.01)
(52) U.S. Cl. .................... 175/371; 175/372
(58) Field of Classification Search ........... 175/367, 175/370, 371, 372
See application file for complete search history.

(56) References Cited

U.S. PATENT DOCUMENTS

| | | | |
|---|---|---|---|
| 2,787,502 A | 4/1957 | Huckshold | |
| 3,193,028 A | 7/1965 | Radzimovsky | |
| 3,550,972 A | 12/1970 | Coski | |
| 3,572,853 A | 3/1971 | Coski | |
| 3,847,235 A | 11/1974 | Goodfellow | |
| 3,998,500 A | 12/1976 | Dixon | |
| 4,136,748 A | 1/1979 | Dickerhoff | |
| 4,145,094 A | 3/1979 | Vezirian | |
| 4,256,193 A | 3/1981 | Kunkel et al. | |
| 4,427,307 A | 1/1984 | Norlander et al. | |
| 4,448,268 A * | 5/1984 | Fuller | 175/228 |
| 4,516,640 A | 5/1985 | Karlsson | |
| 4,552,233 A | 11/1985 | Klima | |
| 4,940,099 A | 7/1990 | Deane et al. | |
| 5,137,097 A * | 8/1992 | Fernandez | 175/228 |
| 6,250,407 B1 | 6/2001 | Karlsson | |
| 6,408,957 B1 | 6/2002 | Slaughter, Jr. et al. | |
| 6,513,607 B2 | 2/2003 | Peterson et al. | |
| 6,695,079 B2 | 2/2004 | Portwood et al. | |
| 6,892,828 B2 | 5/2005 | Rives | |

* cited by examiner

*Primary Examiner*—Daniel P Stephenson
(74) *Attorney, Agent, or Firm*—Schmeiser Olsen & Watts LLP (57) ABSTRACT

An earth bit includes a cone rotatably mounted to a shaft with a hub unit and thrust roller bearings. The hub unit is moveable between mounted and unmounted positions on the shaft, as a single unit, in a repeatable manner. The hub unit includes a pair of roller bearings positioned between inner and outer races. The outer race includes a recess extending around its outer periphery. A sealing structure is slidingly engaged with the recess to provide a seal between the cone and shaft.

24 Claims, 8 Drawing Sheets

EARTH BIT WITH HUB AND THRUST UNITS

BACKGROUND OF THE INVENTION

1. Field of the Invention

This invention relates generally to earth bits having rotatable cones.

2. Description of the Related Art

An earth bit is commonly used to bore holes through earthen annulus. Such holes may be bored for many different reasons, such as drilling for oil, minerals and water. One type of earth bit used for drilling is a rotary earth bit, and several examples are disclosed in U.S. Pat. Nos. 3,550,972, 3,847,235, 4,136,748, and 4,427,307. A rotary earth bit generally includes three earth bit cones rotatably mounted to corresponding lugs. The lugs form a portion of an earth bit body and, as the earth bit body rotates, the cones rotate in response to contacting the earthen annulus.

The rotation of a cone with respect to its corresponding lug is often facilitated by using roller and ball bearings. The ball bearings also operate to retain the cone to the lug, but the roller bearings generally do not. The ball bearings retain the cone to the lug because they extend into opposing grooves formed through them. The opposing grooves are generally machined through the lug and cone, which requires accurate measurements. Inaccuracies in these measurements can cause the cone to be unbalanced so it improperly rotates relative to the lug. When the cone improperly rotates relative to the lug, it wobbles and causes the earth bit to undesirably vibrate.

BRIEF SUMMARY OF THE INVENTION

The present invention employs an earth bit which includes a cone mounted for rotation on a shaft with a hub unit and thrust unit. The thrust unit is useful to space the cone from the shaft. The thrust unit also receives a portion of in-thrust applied to the cone, with the other portion being received by the hub unit. In this way, the in-thrust is received by the earth bit over a larger area and the earth bit is less likely to be damaged so it has a longer lifetime.

The hub unit is useful because it allows the cone to be mounted to the shaft with fewer work steps because it is moveable, as a single unit, between mounted and unmounted positions with the shaft. The hub unit also allows the cone to be mounted more accurately so the cone is balanced when it rotates. When the cone is balanced, it wobbles less and causes the earth bit to vibrate less. When the earth bit vibrates less, it operates more efficiently and has a longer life.

These and other features, aspects, and advantages of the present invention will become better understood with reference to the following drawings and description.

DETAILED DESCRIPTION OF THE INVENTION

Figure 1:
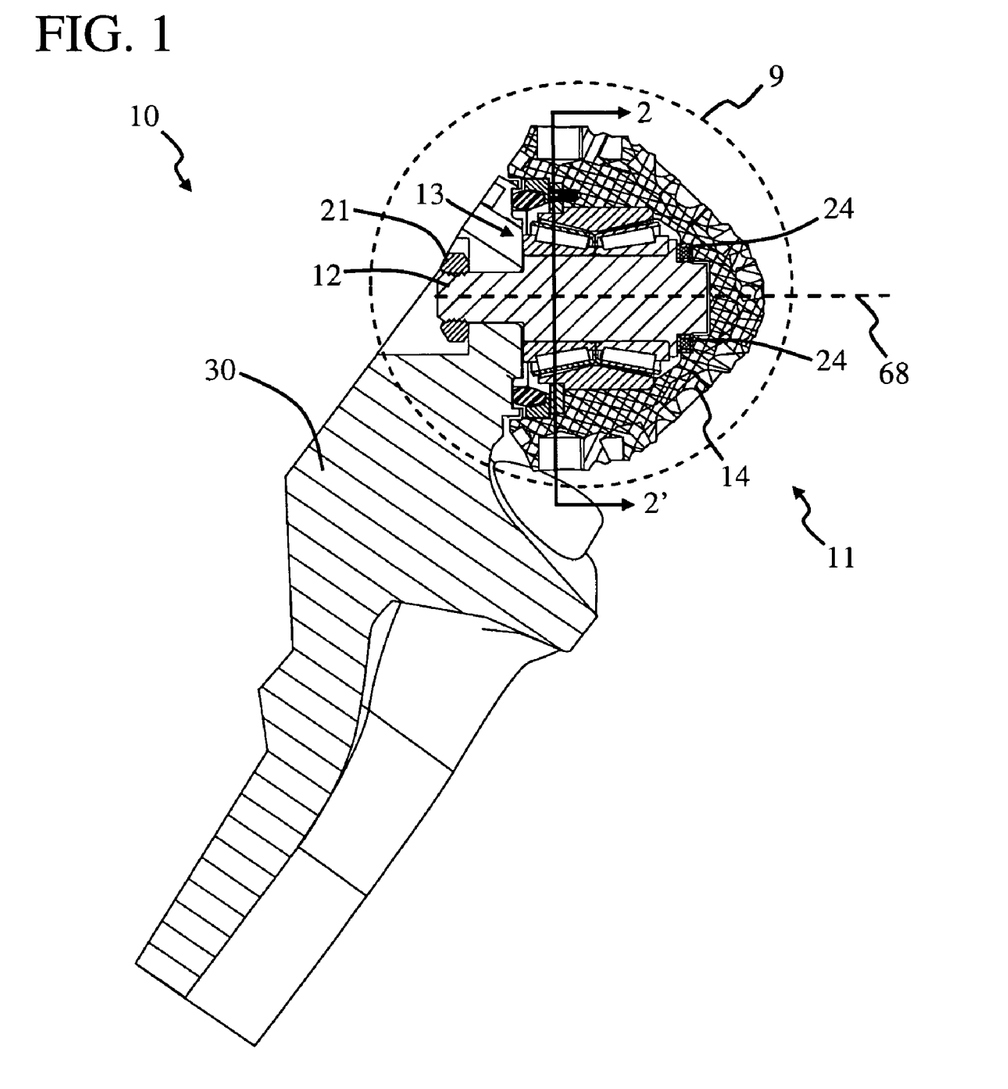
FIG. 1 is a sectional view of an earth bit having an earth bit header assembly with a hub unit and thrust unit, in accordance with the invention.

FIG. 1 is a sectional view of an earth bit 10, in accordance with the invention. In this embodiment, earth bit 10 includes an earth bit header assembly 11 attached to a lug 30. Lug 30 forms a portion of an earth bit body (not shown) and header assembly 11 includes a cone 14 coupled with lug 30 through a shaft 12. As the earth bit body rotates, lug 30 rotates in response. Cone 14 also rotates in response to the rotation of lug 30 when it contacts earthen annulus. Shaft 12 extends along an axis 68 through an opening of lug 30 and is connected therewith using a fastener 21. Fastener 21 can be of many different types, but here it is a threaded fastener. It should be noted that shaft 12 and lug 30 can be a single piece, but they are shown as separate pieces here so they are removeably connected together in a repeatable manner.

In this embodiment, earth bit header assembly 11 includes thrust unit 24 and hub unit 13, both of which rotatably couple cone 14 to shaft 12. In accordance with the invention, hub unit 13 and thrust unit 24 both include roller bearings which facilitate the rotation of cone 14 relative to shaft 12. The roller bearings of hub unit 13 are angled relative to shaft 12 and operate to retain cone 14 to shaft 12 so ball bearings are not needed.

Since ball bearings are not needed, it is unnecessary to machine opposing grooves through shaft 12 and cone 14 to hold them. This avoids the inconvenience of having to accurately position, dimension and shape the opposing grooves. Forming the grooves is generally a time consuming and difficult process and inaccuracies can cause cone 14 to improperly rotate relative to shaft 12. Further, roller bearings are more desirable to use because they can oppose a greater radial load than ball bearings.

It should be noted that roller bearings can be cylindrical and cone shaped. Cylindrical roller bearings have the same dimension at opposed ends and conical roller bearings do not. Cylindrical roller bearings can oppose radial loads and conical roller bearings can oppose both radial and axial loads. A radial load is a force directed perpendicular to the axis of rotation of the roller bearing and an axial load is a force directed parallel to the axis of rotation. Conical roller bearings are often referred to as tapered roller bearings and cylindrical roller bearings are often referred to as non-tapered roller bearings.

It should also be noted that, in the embodiments discussed herein, tapered roller bearings can be substituted for non-tapered roller bearings and non-tapered roller bearings can be substituted for tapered roller bearings. Further, the roller bearings can include sealed and non-sealed roller bearings. In some embodiments, the roller bearings include bearings that utilize other mechanisms to overcome friction, such as pressurized fluids and/or materials having mutually low friction contact surfaces.

Figure 2:
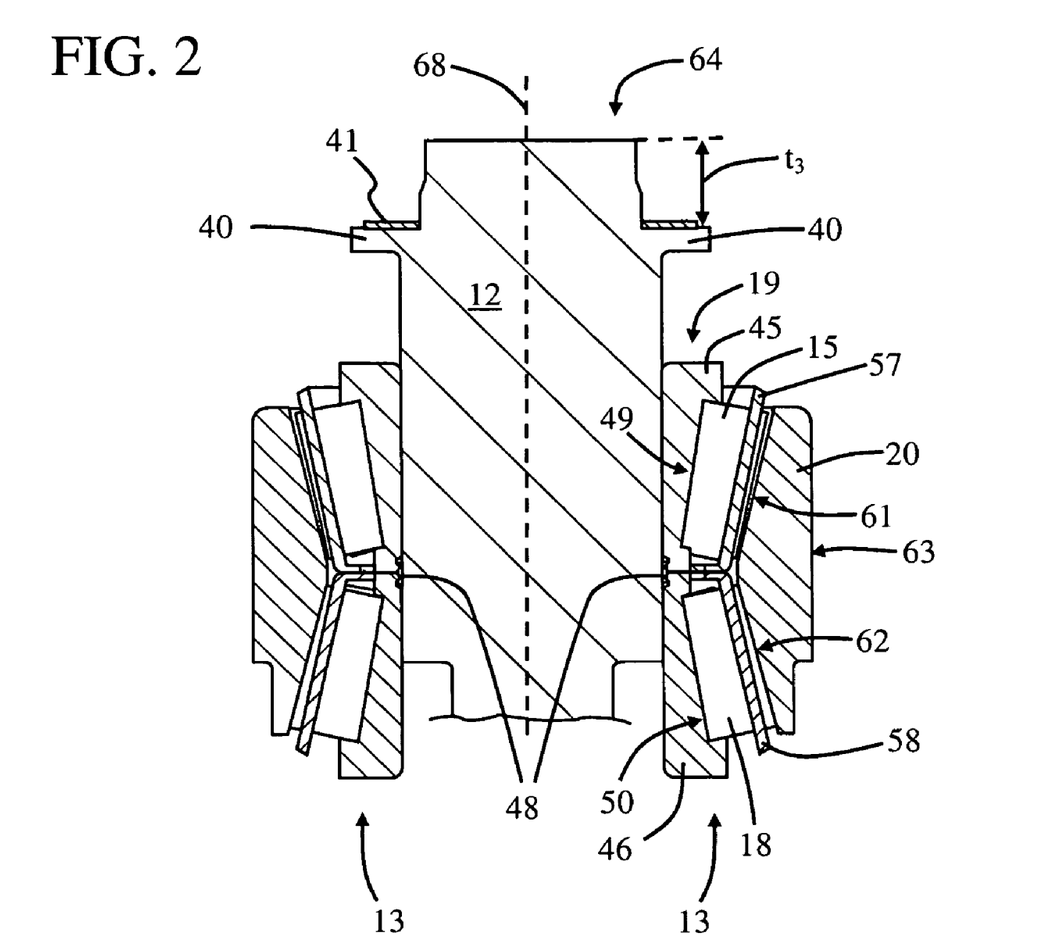
FIG. 2 is a sectional view taken along a cut-line 2-2' of the hub unit of FIG. 1 mounted, as a single unit, to an earth bit shaft.

FIG. 2 is a sectional view of hub unit 13, in accordance with the invention, engaged with shaft 12. In this embodiment, shaft 12 includes an annular flange 40 positioned near its distal end 64. Hub unit 13 is annular and shaped and dimensioned to slidingly engage shaft 12, as a single unit, so it abuts a side of flange 40. An opposed side of flange 40 carries an annular contact pad 41 for engaging thrust unit 24. The opposed side of flange 40 is spaced from distal end 64 by a distance $t_3$. As discussed in more detail below, a portion of hub unit 13 is capable of rotating relative to shaft 12 as cone 14 rotates and another portion is fixedly attached thereto so it does not rotate relative to shaft 12.

Here, hub unit 13 includes an inner race 19 and an outer race 20, both of which can have many different configurations. For example, inner and outer races 19 and 20 can each include one or more pieces to facilitate the assembly of earth bit header assembly 11. In one embodiment, outer race 20 includes two or more pieces connected together, and inner race 19 includes a single piece.

In the embodiment shown in FIG. 2, however, outer race 20 includes a single piece and inner race 19 includes two pieces connected together. Inner race 19 includes annular distal and proximal races 45 and 46 connected together. Distal and proximal races 45 and 46 can be connected together in many different ways, but here a clip 48 is used. The inner peripheries of distal and proximal races 45 and 46 are shaped and dimensioned to frictionally engage shaft 12 so they do not rotate relative to it when slidingly engaged therewith. However, races 45 and 46 can be coupled to shaft 12 in many other ways, such as with a fastener or an adhesive. Distal and proximal races 45 and 46 also include grooves having surfaces 49 and 50, respectively, which extend around their outer periphery for receiving roller bearings, as will be discussed in more detail below.

In this embodiment, outer race 20 is a single annular piece wherein its outer periphery, denoted as surface 63, is shaped to slidingly engage cone 14. The inner periphery of race 20 includes two surface portions tilted outwardly away from each other so that one surface portion, denoted as surface 61, faces the groove in distal race 45 and the other surface portion, denoted as surface 62, faces the groove in proximal race 46. In this way, surface 61 faces surface 49 and surface 62 faces surface 50.

In this embodiment, hub unit 13 also includes annular roller bearing cages 57 and 58. The outer periphery of cages 57 and 58 are fixedly attached to surfaces 61 and 62, respectively. Tapered roller bearings 15 and 18 are coupled with bearing cages 57 and 58, respectively, so they can rotate with respect to them and outer race 20. In this way, roller bearings 15 and 18 are coupled with outer race 20. In this embodiment, tapered roller bearings 15 and 18 are in an "O" arrangement. However, they can be in an "X" arrangement in other embodiments.

The grooves in distal and proximal races 45 and 46 are sized and dimensioned to receive tapered roller bearings 15 and 18, respectively. The grooves are also tilted inwardly towards each other so that surfaces 49 and 50 engage roller bearings 15 and 18, respectively. Tapered roller bearings 15 and 18 are held within their corresponding groove with respective bearing cages 57 and 58. In this way, roller bearings 15 and 18 are rotatably engaged with proximal and distal races 45 and 46 and can rotate in their corresponding grooves. Further, roller bearings 15 and 18 are tilted relative to axis 68 of shaft 12 so they can oppose a larger axial force.

In operation, lug 30 rotates in response to the rotation of the earth bit body of bit 10. As lug 30 rotates, cone 14 rotates in response to contacting earthen annulus. Since outer race 20 is coupled to cone 14, race 20 rotates in response to the rotation of cone 14. Further, since outer race 20 is coupled to roller bearings 15 and 18 with annular bearing cages 57 and 58, these components also rotate in response to the rotation of cone 14. Roller bearings 15 and 18 are rotatable relative to inner race 19, but inner race 19 is frictionally engaged with shaft 12. Hence, in this embodiment, the portion of hub unit 13 that rotates relative to shaft 12 includes outer race 20, as well as bearing cages 57 and 58 and roller bearings 15 and 18. The portion of hub unit 13 that does not rotate relative to shaft 12 includes inner race 19.

Hub unit 13 is useful for several reasons, with one being that cone 14 can be mounted to shaft 12 by performing fewer work steps. This is because hub unit 13 can be preassembled before it is slidingly engaged with shaft 12. Hence, hub unit 13 can be slidingly engaged with shaft 12 as a single unit. This reduces the need for installing spacers of the appropriate shape and dimension between cone 14 and shaft 12, which is time consuming and inconvenient, and is often done with other earth bits.

Installing spacers is time consuming and inconvenient because it involves several work steps. The spacer is generally machined and positioned to see if it fits between the lug and cone. If the spacer does not fit, it is removed and machined again. This process is repeated until the spacer is a desired shape and dimension and does fit. However, the desired spacer shape and dimension is generally different from one earth bit header assembly to another, so this process has to be repeated for each one.

Hub unit 13 is also useful because it allows cone 14 to be mounted to shaft 12 with better controlled tolerances. This allows cone 14 to be more accurately spaced relative to shaft 12 so that the proper rotation of cone 14 about shaft 12 is easier to achieve. Hence, hub unit 13 allows cone 14 to be more easily mounted to shaft 12 so it is balanced for rotation and wobbles less. In this way, as cone 14 rotates, it wobbles less which causes earth bit 10 to vibrate less. This improves the performance of earth bit 10 and extends its life. The performance is improved because as earth bit cone 14 rotates more efficiently, more of its rotational energy is used for cutting and less is wasted. The life of earth bit 10 is increased because cone 14 causes earth bit 10 to vibrate less, so it is less likely to break down or suffer from fatigue.

Figures 3A, 3B:
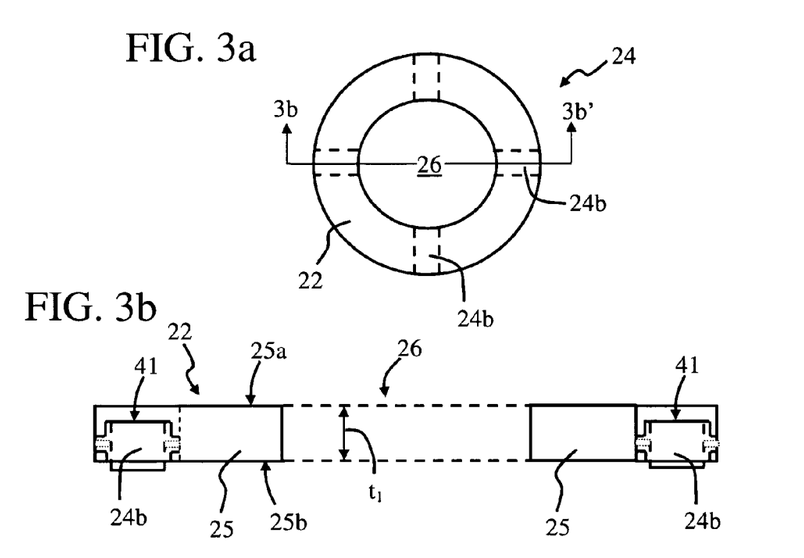
FIG. 3a is a top view of the thrust unit of FIG. 1.
FIG. 3b is a side view of one embodiment of a thrust unit which includes a roller cage.

FIG. 3*a* is a top view of thrust unit 24. In this embodiment, thrust unit 24 has an opening 26 extending through it and includes an annular body portion 22 which carries roller bearings 24*b*. Opening 26 is dimensioned and shaped to receive distal end 64 of shaft 12, as shown in FIG. 2. Roller bearings 24*b* are non-tapered roller bearings, but they can be tapered in other embodiments. It should be noted that thrust unit 24 is shown as including four roller bearings for illustrative purposes, but it generally includes three or more. Body portion 22 can have many different configurations, a few of which will be discussed in more detail presently.

FIG. 3*b* is a side view of one embodiment of thrust unit 24 taken along a cut-line 3*b*-3*b*' of FIG. 3*a*. In this embodiment, body portion 22 includes a roller cage 25 which carries roller bearings 24*b*. Roller cage 25 has a surface 25*a* which engages cone 14 and an opposed surface 25*b* which faces flange 41. In operation, surface 25*a* is fixedly engaged with cone 14 so that roller cage 25 rotates with cone 14 and relative to shaft 12. Surface 25*b* faces flange 41 and is spaced from it by roller bearings 24*b*. Roller bearings 24*b* engage annular contact pad 41 and rotate thereon.

Figure 3C:
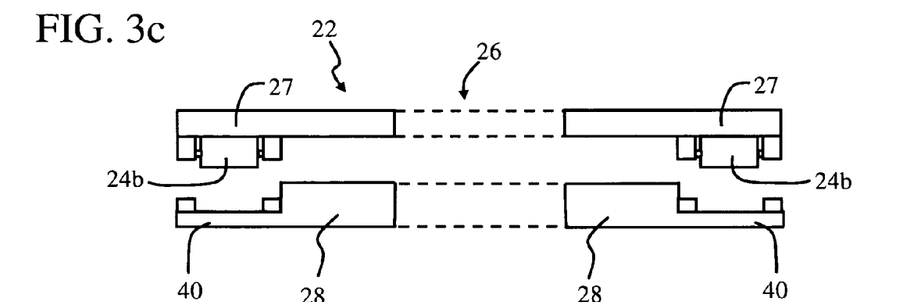
FIGS. 3c and 3d are side views of an embodiment of a thrust unit which includes upper and lower annular pieces.
Figure 3D:
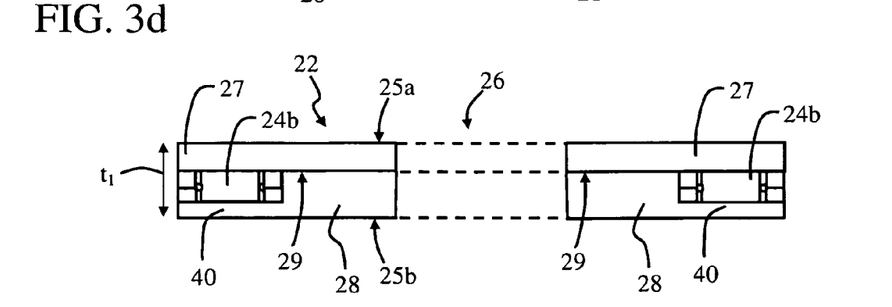

FIGS. 3*c* and 3*d* are side views of another embodiment of thrust unit 24 taken along cut-line 3*b*-3*b*' of FIG. 3*a*. In this embodiment, thrust unit 24 includes an annular upper piece 27 and a lower annular piece 28 in decoupled (FIG. 3C) and coupled (FIG. 3*d*) conditions. Upper annular piece 27 is moveable between positions decoupled from (FIG. 3*c*) and coupled to (FIG. 3*d*) lower annular piece 28. Upper and lower annular pieces 27 and 28 are slidingly engaged with each other at an intersection 29 so they can rotate relative to each other.

Upper annular piece 27 defines surface 25a, which is fixedly attached to cone 14 and lower annular piece 28 defines surface 25b which is fixedly attached to flange 41. It should be noted that in some embodiments, lower annular piece 28 can be machined directly into shaft 12 and upper annular piece 27 can be machined directly into cone 14. Here, upper annular piece 27 carries roller bearings 24b mounted for rotation therewith and lower annular piece 24 includes a race 40. When upper annular piece 27 is coupled with lower piece 28, roller bearings 24b are engaged with race 40.

Figure 4:
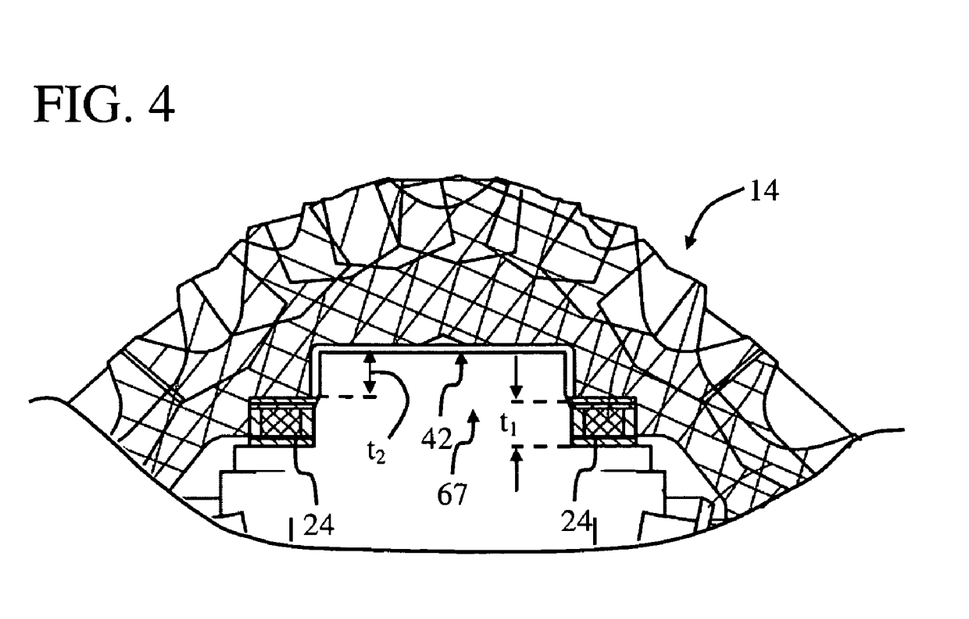
FIG. 4 is a detailed view of the cone included with the earth bit of FIG. 1.

In accordance with the invention, a thickness $t_1$, of thrust unit 24 is chosen so that it operates as a spacer and hub unit 11 and shaft 12 fit with cone 14. In this embodiment, a thickness $t_2$ of a recess 67 (FIG. 4) formed through cone 14 is chosen so that the sum of thicknesses $t_1$, and $t_2$ match thickness $t_3$. In this way, thrust unit 24 is used as a spacer so that distal end 64 of shaft 12 fits into recess 67 and annular contact pad 41 engages thrust unit 24. It should be noted that thrust unit 24 can be preloaded on shaft 12 or it can be positioned within cone 14 before distal end 64 of shaft 12 is inserted through it.

Thickness $t_1$ can be standardized so it is essentially the same from one thrust unit to another. Further, thickness $t_2$ can be standardized so it is essentially the same from one cone to another. Hence, fewer work steps are needed to assemble earth bit 10 because the standardization of thicknesses $t_1$ and $t_2$ makes it possible to have cone 14, shaft 12, thrust unit 24 and hub unit 13 connect together in fewer assembly iterations. If thicknesses $t_1$ and $t_2$, as well as the shapes and dimensions of the other components, are controlled well enough, it should be possible to assemble earth bit 10 in one assembly iteration.

Figure 5:
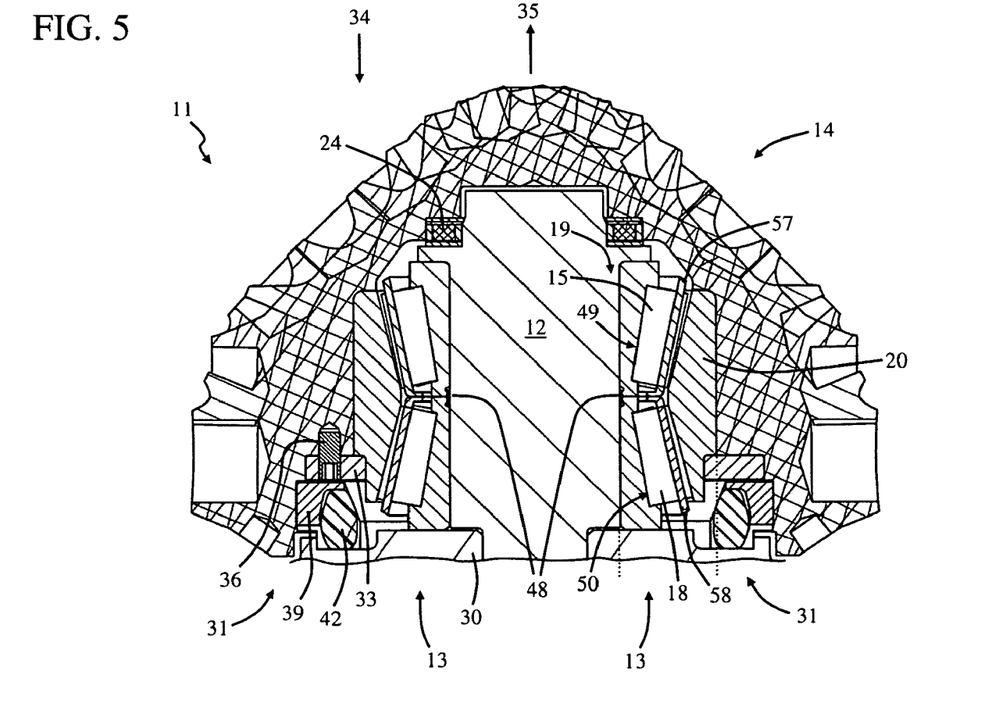
FIGS. 5 and 6 are sectional views of the earth bit header assembly, taken along cut-line 2-2' as shown in region 9 of FIG. 1, in mounted and unmounted conditions, respectively.
Figure 6:
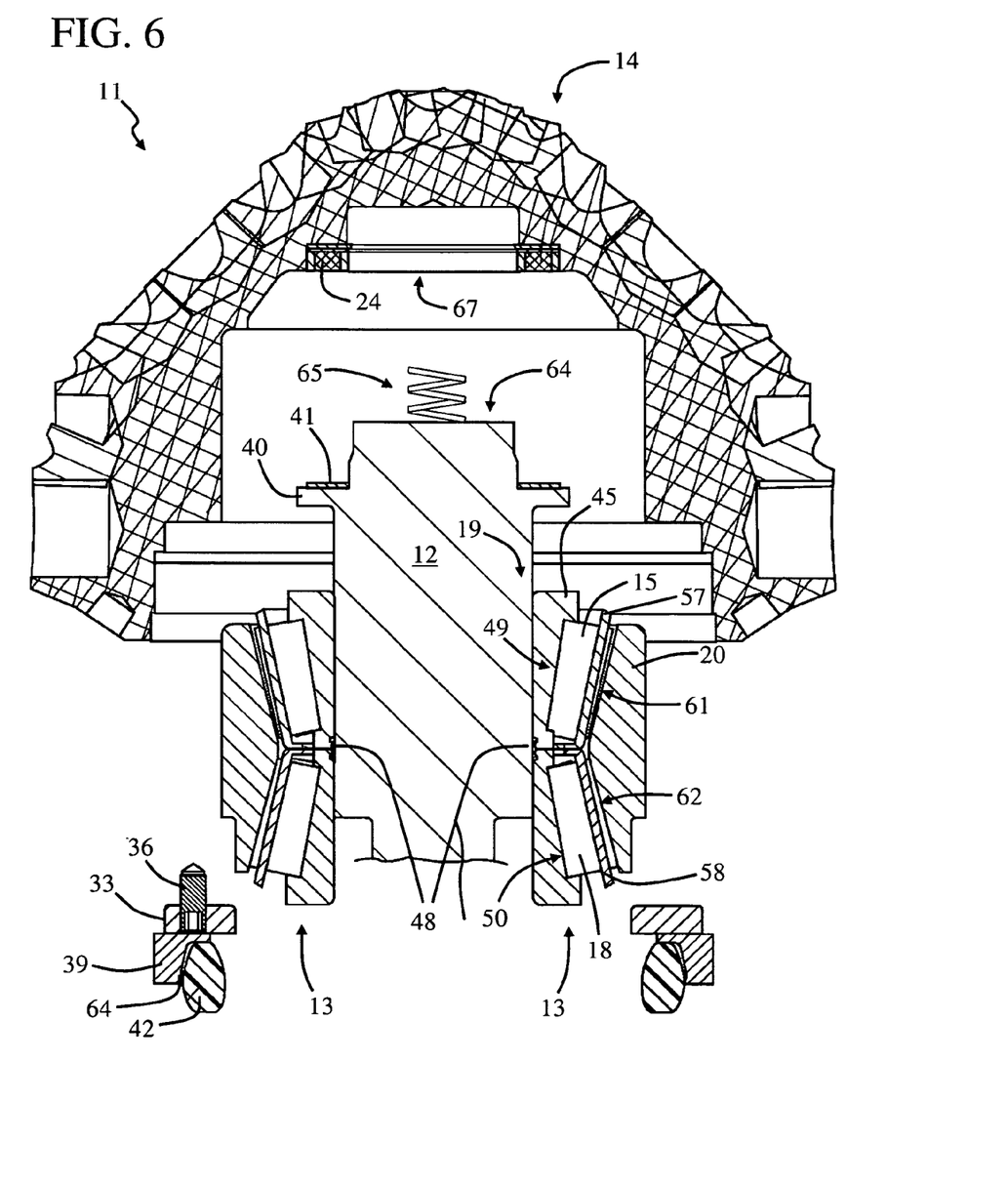

FIGS. 5 and 6 are sectional views of earth bit header assembly 11, as shown in a region 9 of FIG. 1, in mounted and unmounted conditions, respectively. Hub unit 13 can be held to cone 14 in many different ways. In this embodiment, hub unit 13 is held to cone 14 with a sealing structure 31. Sealing structure 31 generally includes one or more retaining rings. Here, sealing structure 31 includes a retaining ring 33 that is fastened with a fastener 36 to cone 14. Fastener 36 can be of many different types, but here it is a threaded screw 36. Sealing structure 31 also includes a retaining ring 39 engaged with retaining ring 33 and fastener 36. It should be noted that rings 33 and 39 are shown as being separate pieces, but they can be a single integrated piece in other embodiments. Further, fastener 36 is shown as being separate from rings 33 and 39, but it can also be integrated therewith.

In this embodiment, the inner periphery of retaining ring 39 includes a recess 64 which is shaped and dimensioned to receive a seal 42. Seal 42 is positioned to sealingly engage ring 39 and lug 30 (FIG. 1) and reduce the likelihood of debris entering the region between cone 14 and shaft 12. Seal 42 is also positioned to retain lubrication in the region between cone 14 and shaft 12. Seal 42 can be of many different types, such as a mechanical face seal, an O-ring seal and another type of seal used to keep lubricant within earth bit bearing assembly 11 and debris out. One example of a mechanical face seal is disclosed in U.S. Pat. No. 6,513,607, the contents of which are incorporated herein by reference.

Earth bit header assembly 11 is often subjected to both in-thrust and out-thrust during its operation, as shown in FIG. 5. In-thrust, represented as force 34, moves cone 14 towards shaft 12 and out-thrust, represented as force 35, moves cone 14 away from shaft 12. Force 35 is applied to hub unit 13 and, in particular, roller bearings 15 and 18 so they receive this load more than thrust unit 24. In accordance with the invention, force 34 is applied to both thrust unit 24 and roller bearings 15 and 18. In this way, force 34 is applied to both thrust unit 24 and hub unit 13 so more than one component receives this load. Since more than one component receives force 34, it is distributed over a larger area of earth bit 10 and, consequently, imparts less fatigue. This allows earth bit 10 to be subjected to a larger magnitude in-thrust with a decreased likelihood of breaking down.

In some embodiments, the portions of force 34 applied to thrust unit 24 and hub unit 13 can be controlled. The portions of force 34 can be controlled in many different ways. In one embodiment, the rotation axis between roller bearings 15 and 18 relative to axis 68 of shaft 12 is chosen so that desired amounts of force 34 are applied to thrust unit 24 and hub unit 13. As the angle between the rotation axes of roller bearings 15 and 18 relative to axis 68 increases, the amount of force 34 applied to roller bearings 24 decreases and that applied to hub unit 13 increases. As the angle between the rotation axes of roller bearings 15 and 18 relative to axis 68 decreases, the amount of force 34 applied to roller bearings 24 increases and that applied to hub unit 13 decreases.

In another embodiment, the amount of force 34 applied to hub unit 13 and thrust unit 24 is controlled by choosing whether or not bearings 15 and 18 are tapered or non-tapered roller bearings. The amount of force 34 applied to hub unit 13 is increased and the amount of force 34 applied to thrust unit 24 is decreased if roller bearings 15 and 18 are chosen to be tapered roller bearings. The amount of force 34 applied to hub unit 13 is decreased and the amount of force 34 applied to thrust unit 24 is increased if roller bearings 15 and 18 are chosen to be non-tapered roller bearings.

In some embodiments, the portions of force 34 applied to hub unit 13 and thrust unit 24 is controlled by positioning a resilient member between shaft 12 and cone 14, as shown in FIG. 6. The resilient member can be of many different types, such as a resilient block of rubber, and can be positioned at many different locations. In one particular embodiment, the resilient member is a spring 65 engaged between cone 14 and the distal end of shaft 12. The spring constant of spring 65 is chosen so that a desired amount of force 34 is applied to thrust unit 24 and a desired amount is applied to hub unit 13. If the spring constant of spring 65 is increased, more of force 34 is applied to hub unit 13 and less is applied to thrust unit 24. If the spring constant of spring 65 is decreased, less of force 34 is applied to hub unit 13 and more is applied to thrust unit 24.

Figure 7:
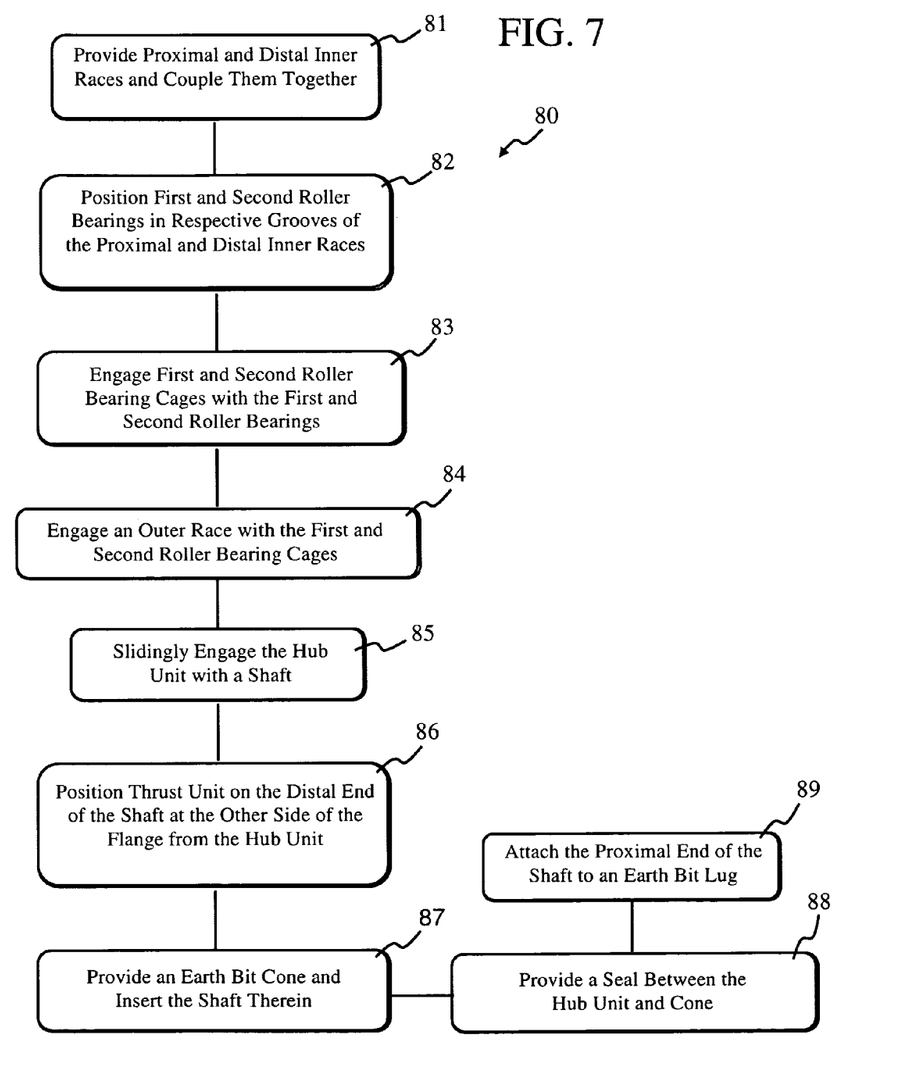
FIGS. 7, 8 and 9 are block diagrams of methods of mounting a cone with a shaft using hub and thrust units, in accordance with the invention.

FIG. 7 is a block diagram of a method 80 of mounting a cone with a lug using a hub unit and a thrust unit, in accordance with the invention. In this embodiment, method 80 includes a step 81 of providing proximal and distal inner races and coupling them together. The distal and proximal inner races can be coupled together in many different ways, such as with a fastener and/or clip. The proximal and distal inner races are annular and include grooves extending around their outer periphery and tilted inwardly towards each other. In a step 82, first and second roller bearings are positioned in respective grooves of the proximal and distal inner races. The first and second roller bearings are tilted inwardly towards each other because their corresponding grooves are also tilted.

In a step 83, first and second roller bearing cages are engaged with the first and second tapered roller bearings. The first and second roller bearing cages are positioned to hold the first and second tapered roller bearings to the proximal and distal inner races, respectively. In a step 84, an outer race is engaged with the first and second roller bearing cages. In accordance with the invention, the outer race, first and second roller bearing cages, first and second roller bearings, and the proximal and distal inner races form the hub unit.

In a step 85, the hub unit is slidingly engaged with a shaft. The shaft can have many different configurations. In this embodiment, the shaft includes an annular flange which extends around its outer periphery proximate to its distal end. The proximal end of the shaft is inserted through the hub unit and the hub unit is moved along its length until it engages the annular flange.

In a step 86, a thrust unit is positioned on the distal end of the shaft at the other side of the flange from the hub unit. The thrust unit can have many different configurations, but it generally includes a body which carries a plurality of roller bearings.

In a step 87, an earth bit cone is provided and the shaft, with the hub unit and thrust unit positioned thereon, are inserted into it. In some embodiments, step 87 can include positioning a spring between the shaft and cone. The spring can be positioned at many different locations, but it is generally positioned between the cone and the distal end of the shaft. In a step 88, a sealing structure is used to hold the hub unit to the cone. The sealing structure generally includes one or more retaining rings which can be fastened to the cone in many different ways. In one way, a fastener is used to fasten the retaining ring(s) to the cone. In some embodiments, the sealing structure can include a sealing ring engaged with the retaining ring(s). The sealing ring is positioned to provide a seal between the cone and shaft.

In a step 89, the proximal end of the shaft is attached to an earth bit lug. The proximal end of the shaft can be attached to the earth bit lug in many different ways. In one embodiment, the proximal end of the shaft is threaded and extends through an opening of the lug. A threaded fastener is threadingly engaged with the proximal end of the shaft so it is fastened to the lug. It should be noted that earth bits generally include more than one cone, so the steps of method 80 can be repeated. For example, a tri-cone earth bit includes three cones, so method 80 is implemented three times (i.e. one time for each cone). It should also be noted that the steps in method 80 can be performed in different orders, one of which will be discussed presently.

Figure 8:
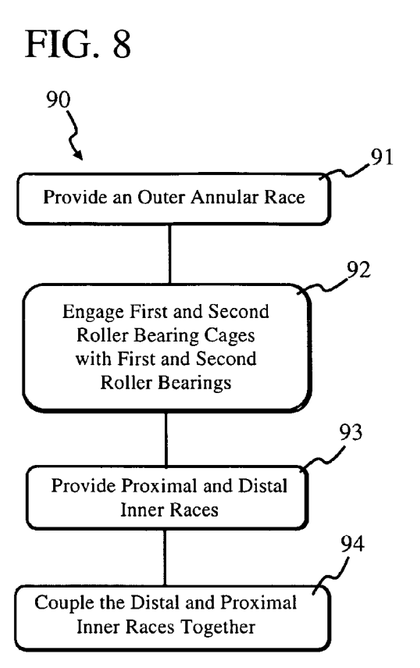

FIG. 8 is a block diagram of a method 90 of mounting a cone with a lug using a hub unit, in accordance with the invention. In this embodiment, method 90 includes a step 91 of providing an outer annular race. The outer periphery of the outer race is shaped and dimensioned to slidingly engage an earth bit cone. The inner periphery of the outer race includes two surface portions tilted away from each other.

In a step 92, first and second roller bearing cages are engaged with first and second roller bearings. The first and second roller bearings are coupled to corresponding inner surface portions of the outer race. The first and second roller bearing cages hold the first and second roller bearings away from the outer race.

In a step 93, proximal and distal inner races are provided. The proximal and distal inner races are annular and include grooves extending around their outer periphery. The proximal inner race is positioned so its groove receives one of the roller bearings and the distal inner race is positioned so its groove receives the other roller bearing. The grooves of the proximal and distal inner races are tilted inwardly towards each other so they face corresponding inner surfaces of the outer race.

In a step 94, the distal and proximal inner races are coupled together. The distal and proximal inner races can be coupled together in many different ways, such as with a fastener, clip, etc. In accordance with the invention, the outer race, first and second roller bearing cages, first and second roller bearings, and the proximal and distal inner races form the hub unit.

Figure 9:
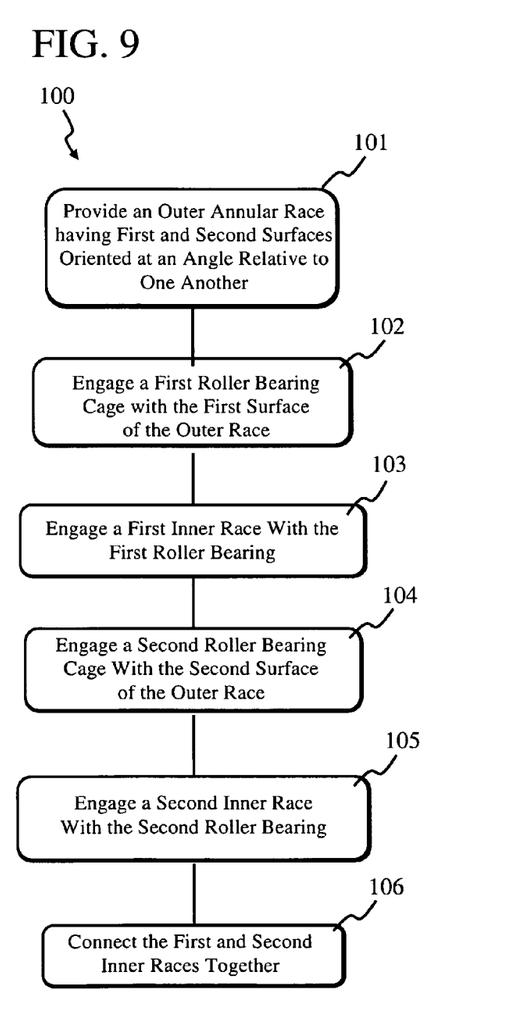

FIG. 9 is a block diagram of a method 100 of mounting a cone with a lug using a hub unit, in accordance with the invention. In this embodiment, method 100 includes a step 101 of providing an outer annular race having first and second surfaces oriented at an angle relative to one another. For example, the first and second surfaces of the outer race are tilted away from each other. In a step 102, a first roller bearing cage is engaged with the first surface of the outer race. The first roller bearing cage is coupled to a first roller bearing. In a step 103, a first inner race is engaged with the first roller bearing. The first inner race includes a groove which receives the first roller bearing so it can rotate therein.

In a step 104, a second roller bearing cage is engaged with the second surface of the outer race. The second roller bearing cage is coupled to a second roller bearing. In a step 105, a second inner race is engaged with the second roller bearing. The second inner race includes a groove which receives the second roller bearing so it can rotate therein. In a step 106, the first and second inner races are connected together. The first and second races can be connected together in many different ways, such as with a clip and/or fastener.

It should be noted that methods 90 and 100 can include many other steps, such as those discussed above with method 80. For example, methods 90 and 100 can include a step of slidingly engaging the hub unit with the shaft and engaging the shaft with the cone. The hub can be coupled to the cone with sealing structure and the proximal end of the shaft can be attached to the earth bit lug. Further, a thrust unit can be positioned between the distal end of the shaft and the cone.

Methods 80, 90 and 100 are useful because the shaft is removeably attached with the lug in a repeatable manner. This reduces the necessity of heat treating the shaft and lug, which is typically done when they are a single integrated piece. Heat treating the shaft and lug is time consuming and inconvenient and requires expensive equipment and highly trained personal, so avoiding this step it desirable.

The embodiments of the invention described herein are exemplary and numerous modifications, variations and rearrangements can be readily envisioned to achieve substantially equivalent results, all of which are intended to be embraced within the spirit and scope of the invention.

The invention claimed is:

1. An earth bit, comprising:
   a shaft;
   a hub unit carried by the shaft, the hub unit including a pair of roller bearings positioned between inner and outer races, at least one of the inner and outer races including two or more pieces connected together; and
   a thrust unit which includes an annular body portion with an opening, and thrust roller bearings mounted to the distal end of the shaft, the shaft extending through the central opening.

2. The bit of claim 1, wherein the shaft includes a flange positioned between the hub unit and thrust roller bearings, wherein the thrust roller bearings engage the flange.

3. The bit of claim 2, wherein the axis of rotation of the thrust roller bearings is perpendicular to the axis of rotation of the shaft.

4. The bit of claim 1, wherein the hub unit is repeatably moveable, as a single unit, between mounted and unmounted positions with the shaft.

5. The bit of claim 1, wherein the pair of roller bearings are caged roller bearings with the cages being coupled with the outer race.

6. The bit of claim 5, wherein the roller bearings are tapered roller bearings.

7. The bit of claim 1, wherein the inner race includes separate grooves for receiving the pair of roller bearings.

8. The bit of claim 1, wherein the pair of roller bearings are tapered and the thrust roller bearings are non-tapered.

9. The bit of claim 1, wherein the axis of rotation of the pair of roller bearings is at a non-zero angle relative to the axis of rotation of the shaft.

10. The bit of claim 1, further including a clip which connects the pieces together.

11. An earth bit, comprising:
an earth bit shaft and cone;
a hub unit which rotatably couples the cone to the shaft, the hub unit including a pair of roller bearings positioned between inner and outer races, the outer race including a recess extending around its outer periphery; and
a sealing structure slidingly engaged with the recess, wherein the sealing structure holds the hub unit to the cone.

12. The bit of claim 11, wherein the sealing structure extends through the cone and outer race.

13. The bit of claim 11, wherein the sealing structure is attached to the cone.

14. The bit of claim 11, further including thrust roller bearings positioned between the cone and the distal end of the shaft.

15. The bit of claim 14, wherein an in-force applied to the cone is distributed throughout the earth bit through the hub unit and thrust roller bearings.

16. The bit of claim 14, further including a spring which determines the distribution of an in-force applied to the cone between the hub unit and thrust roller bearings.

17. The bit of claim 16, wherein the earth bit shaft includes a flange engaged with the thrust roller bearings.

18. The bit of claim 11, wherein the inner race includes annular distal and proximal races connected together with a clip.

19. A method of mounting a cone with a lug, the method comprising:
providing an earth bit shaft;
providing a hub unit, the hub unit including a pair of roller bearings positioned between inner and outer races, at least one of the inner and outer races including two or more pieces connected together;
coupling a hub unit with the shaft, wherein the hub unit is coupled to the shaft as a single unit; and
providing thrust roller bearings mounted to the distal end of the shaft.

20. The method of claim 19, further including positioning an earth bit cone so it is rotatably mounted to the shaft with the hub unit and thrust roller bearings.

21. The method of claim 20, further including positioning a sealing structure so it extends through the cone and outer race.

22. The method of claim 20, further including positioning a spring between the earth bit cone and a distal end of the shaft.

23. The method of claim 19, further including mounting the proximal end of the shaft to an earth bit lug.

24. The method of claim 19, further including connecting the pieces together with a clip.

* * * * *